US007629585B2

(12) United States Patent
van Dulmen et al.

(10) Patent No.: US 7,629,585 B2
(45) Date of Patent: Dec. 8, 2009

(54) METHOD AND APPARATUS FOR IMAGING BY SPECT

(76) Inventors: Adrianus A. van Dulmen, Schoutsakker 4, Schoorl (NL) 1871 CZ; Stéphan Walrand, 31, rue de Baileux, Silenrieux (BE) B-5630

( * ) Notice: Subject to any disclaimer, the term of this patent is extended or adjusted under 35 U.S.C. 154(b) by 0 days.

(21) Appl. No.: 11/988,756

(22) PCT Filed: Mar. 2, 2006

(86) PCT No.: PCT/EP2006/002094

§ 371 (c)(1),
(2), (4) Date: Jan. 14, 2008

(87) PCT Pub. No.: WO2006/094772

PCT Pub. Date: Sep. 14, 2006

(65) Prior Publication Data

US 2008/0185527 A1    Aug. 7, 2008

(30) Foreign Application Priority Data

Mar. 8, 2005   (EP) ................................ 05075567
Oct. 31, 2005  (EP) ................................ 05077495

(51) Int. Cl.
G01T 1/164    (2006.01)
(52) U.S. Cl. ................................................. 250/363.04
(58) Field of Classification Search ............. 250/363.04
See application file for complete search history.

(56) References Cited

U.S. PATENT DOCUMENTS

| 5,032,728 | A  | * | 7/1991  | Chang et al. ........... 250/363.04 |
| 5,825,031 | A  |   | 10/1998 | Wong et al. |
| 6,225,631 | B1 |   | 5/2001  | Mastrippolito et al. |
| 6,448,559 | B1 |   | 9/2002  | Saoudi et al. |
| 2003/0111608 | A1 | * | 6/2003  | Dulmen et al. ........... 250/363.1 |
| 2004/0239941 | A1 |   | 12/2004 | Schramm et al. |

FOREIGN PATENT DOCUMENTS

| WO | WO9909431 A1 | 2/1999 |
| WO | WO0152269 A1 | 7/2001 |
| WO | WO02082122 A2 | 10/2002 |

OTHER PUBLICATIONS

Brasse, D., Piqueras, I., and Guyonnet, J.L., "Development of a high resolution SPECT system dedicated to small animal imaging." 2004 IEEE Nuclear Science Symposium Conference Record, Oct. 16-22, 2004, vol. 6, pp. 3868-3871.*
Brasse, D et al, "Development of a high resolution SPECT system dedicated to small animal imaging", Nuclear Science Symposium Conference Record, 2004 IEEE, Oct. 16-22, 2004, pp. 3868-3871, vol. 6, IEEE, Piscataway, NJ.

* cited by examiner

*Primary Examiner*—Constantine Hannaher
(74) *Attorney, Agent, or Firm*—Lawrence E. Laubscher, Jr.

(57)    ABSTRACT

Equipment for imaging a target organ in a small animal by SPECT uses the LOrA technique, wherein each gamma detector of the imaging system includes a plurality of sensitive crystals, curved to a segment of an essentially annular body, and a rake collimator with a small slit width.

17 Claims, 7 Drawing Sheets

METHOD AND APPARATUS FOR IMAGING BY SPECT

The present invention relates to an equipment for imaging a target organ in a small animal by SPECT, comprising an imaging system and a table for an animal to be examined, said system comprising (i) a plurality of gamma detectors, essentially situated at the corners of a rectangle surrounding said table, wherein each gamma detector comprises a plurality of sensitive crystals in side by side arrangement and is provided on its front with a rake collimator, comprising two raised walls slanted towards the target to leave a longitudinal slit in between their top ends, and (ii) means for positioning said system relative to said table in two perpendicular directions, both transverse to the table length, to effect movements parallel and perpendicular to the table surface. The imaging system comprises preferably two to four, more preferably four, gamma detectors.

Computed emission tomography two related techniques, viz. single photon emission computed tomography (SPECT) and positron emission tomography (PET). The SPECT technique is routinely used in clinical studies. Conventional SPECT is performed by using a gamma camera, comprising a collimator fixed on a gamma detector, which gamma camera follows a revolution orbit around the body of a living being. The gamma rays, emitted by a radioactive tracer, accumulated in certain tissues or organs of the body of the being, are sorted by the collimator and recorded by the gamma detector under various angles around the body, the collimator always pointing to (facing) said body. From the acquired planar images lire distribution of the activity inside the body of the being can be computed using certain reconstruction algorithms.

The means of positioning the imaging system relative to the table, as referred to in the opening paragraph, enables the user to apply the so-called Linear Orbit Acquisition (LOrA) technique. This technique enables the user of the system to obtain reconstruction images with a substantially improved sensitivity-resolution couple. The LOrA tomographic method of imaging a target organ in the body of a living being by SPECT has been described in European patent no. 1010019, in European patent application no. 1247280, and in European patent application no. 1319190, all in the name of applicant. The collimator used in lire first patent publication is a fan-beam collimator with a reduced focal length, the rake collimator in lire second one is a collimator having in addition to a plurality of collimator septa at least one raised wall, extending in the longitudinal direction of the detector and transversally positioned to said septa. In a preferred embodiment this rake collimator is provided with two raised walls positioned at both edges of the collimator and slanted inwards.

Obviously several means for positioning the imaging system relative to the table are at the disposal of the user of the system, e.g. as described in the "detailed description of the drawings" paragraph of EP 1010019: Each detector-collimator combination can be moved along a rail, perpendicular to the table length; lire rails may be attached to each other to constitute a rigid frame.

As described above EP 1010019, the images are acquired along e.g. four linear paths in directions perpendicular to the body length of the living being or to the table length, by shifting the detector-collimator combinations essentially parallel to their initial positions along said paths. If desired, dependent on the body length vis-à-vis the size of the detector-collimator combinations, these acquisitions may be repeated 1 to 3 times after shilling the table plus living being within the collimators, or vice versa; often a repetition is not necessary, or, if desired, one or two repetitions will suffice.

The present invention relates to an equipment for imaging a target organ in a small animal. It should be mentioned, that by the term "target organ" is meant the organ or tissue to be studied or investigated by using the equipment of the invention. The term "target organ" obviously encompasses a plurality of organs to be studied simultaneously and also a part of the body or even the complete body of the animal.

The radio-imaging of small animals, in particular test animals, viz. rats, is described in U.S. Pat. No. 6,225,631 in the name of Mastrippolito et al. The authors have observed, that the spatial resolution of conventional SPECT imaging is insufficient for carrying out studies in small animals like rats. To improve this situation, they have invented a device, comprising a plurality of detectors (typically fifteen) associated with collimators, and processing means associated therewith. This complicated device for carrying out traditional SPECT and PET is suggested to produce satisfactory results as to the spatial resolution of the images obtained.

According to the present invention it has been found, that the equipment for imaging a target organ in a small animal by SPECT according to the LOrA technique can be improved more simply, by using an imaging system as defined above, wherein each sensitive crystal tapers in one direction towards the table, so that said plurality of tightly joined crystals form a sensitive layer curved to a segment of an essentially annular body surrounding said table, and that the top ends of the raised walls of each rake collimator leave a longitudinal slit, parallel to the table length and with a width from 0.1 to 3 mm. By using such a sensitive layer, having a curved surface towards the target, the problem of "blurring" of the images is avoided. If gamma detectors with flat sensitive layers are used, as shown in the figures of EP 1010019 and 1247280, the phenomenon of "blurring" frequently occurs by imaging small animals. This phenomenon of "blurring" of the images is the result of insufficient spatial resolution. This phenomenon manifests itself more seriously if isotopes with higher energy gamma rays, such as indium-111, gallium-67 and iodine-131, are used as a source of radioactivity.

Therefore the use of curved sensitive layers in the equipment for imaging a small animal by SPECT according to the LOrA technique considerably improves the spatial resolution of the images obtained. This is indeed satisfactory for imaging small animals like rats. It has been observed, however, that for smaller animals like mice this improvement of the spatial resolution is still not completely satisfactory. The additional use of a rake collimator, having a very small slit in between their top ends, viz. of between 0.1 to 3 mm, brings the equipment in an optimal condition for imaging all small test animals by SPECT according to the LOrA technique. This effect is apparently achieved by cooperation of both inventive features, resulting in a so significant improvement of the spatial resolution of the images that even small animals like mice can successfully be imaged by the equipment of the invention.

Preferably the tapering crystals of the sensitive layer are so dimensioned, that each crystal has four sidewalls of which one opposite couple slightly slants towards the table for the animal to be examined. Advantageously each of the sensitive crystals arranged in the sensitive layer presents a rectangular cross section.

Further each detector may comprise at least one additional curved layer, comprising a plurality of sensitive crystals. Said additional layer is essentially concentric with the inner layer and adjoins its outer surface.

Preferably the sensitive crystals have been manufactured from one or more of the following materials: CsI(Na), BGO, GSO, LGSO and LSO. In addition a so-called solid state detector may be used, as described in the above European patent application no. 1319190. Such a detector comprises a plurality of closely-packed detecting elements, preferably CZT-crystals.

In a further preferred embodiment, the imaging system of the equipment of the invention comprises in addition means for moving said segments of joined sensitive crystals from and towards the table. Such means constitute means for moving the detector-collimator combinations from and towards the table with the animal to be examined, and may obviously comprise radially positioned rails systems or sliding guides, allowing the segments to move into an outward and inward direction in relation to the target. In this manner various test animals, like mice, rats and guinea pigs, can be studied easily with the same equipment, by simply tuning the room between the segments to the size of the animals to be investigated.

Huge amounts of test animals are "consumed", i.e. sacrificed and then examined, annually by the clinical testing of pharmaceuticals. The use of this simple imaging system for the examination of small animals allows a considerably lower (up to 40%!) consumption of test animals.

Rake collimators, as well as their use in imaging a living being by SPECT, in particular according to the LOrA technique, are described in the above EP 1247280. In a suitable embodiment such rake collimators comprise, in addition to a plurality of collimator septa, two raised walls, slanted inwards to form, in cross section, the sides of a trapezium with a topline-length from 3 to 12 mm.

The top ends of the raised walls of the collimators used in the equipment of the present invention leave a longitudinal slit with a width from 0.1 to 3 mm, so that a collimator can be used with a slit width adjusted to the size of the animal.

In a preferred embodiment of the equipment of the invention, the imaging system comprises in addition means for moving the segments from and towards the table. In performing imaging studies of small animals the collimators together, as part of the system in this preferred embodiment of the invention, are allowed to closely surround the test animal on the table by using said means for moving the detector-collimator segments, and consequently the segments of sensitive layers, from and towards the test animal on the table.

It has been further been found, that the equipment of the present invention is a versatile equipment if, in a preferred embodiment, the collimators are reversibly removable from the system. For this purpose the imaging system of the equipment of the present invention in addition comprises means for removing and reinserting said collimators from and into their positions in front of the gamma detectors, respectively. Said means for removing and reinserting the collimators may conveniently comprise a number of slides or sliding grooves, allowing the outer ridges of the collimators to be moved slidably from and to their positions.

Such means also allow the application of related computed emission tomographical techniques, in particular of PET imaging, by a relatively simple adjustment. This means, that one system is sufficient both for SPECT and for PET imaging. Consequently, the system of the present invention saves a lot of money, such as purchasing costs and maintenance costs of a separate PET system and overhead costs (space, etc.).

Such means for removing and reinserting the collimators can also be used conveniently for substituting the collective collimators for another collimator collection, having a different slit width tuned to a differently sized animal.

It has further been found, that for the purpose of imaging a small animal by SPECT according to the LOrA technique alternatively a rake collimator can be used, comprising two raised walls slanted inwards and provided at their top ends with adjustable elements to leave a longitudinal slit with a width adjustable from 0.1 to 3 mm between their extremities.

In this manner the effectivity of this rake collimator can be improved by adjusting (tuning) the width of the slit between the slanted walls to the radioactivity of the target organ, e.g. of the studied test animal or a certain part or organ/tissue of this animal. The elements adjusting the width of the slit can be operated manually or mechanically (e.g. electrically) by means usual for this purpose.

It has also been found, that such a rake collimator, wherein the raised walls and the adjustable elements have been manufactured from a material as defined in the above EP 1247280, preferably from tungsten, in a very suitable embodiment is provided with adjustable elements comprising at their extremities noses of iridium, gold or platinum.

The invention also relates to a system for imaging a target organ in a living being by SPECT, for use in an equipment as described above. Such an equipment comprises a plurality of gamma detectors, essentially situated at the corners of a rectangle, wherein each gamma detector comprises a plurality of sensitive crystals in side by side arrangement and is provided with a rake collimator, comprising two raised walls slanted towards the target to leave a longitudinal slit in between their top ends. The imaging system comprises preferably two to four, more preferably four, gamma detectors. This system is characterized in that each gamma detector comprises a plurality of sensitive crystals tapering in one forward direction, so that said plurality of tightly joined crystals form a sensitive layer curved to a segment of an essentially annular body, and that the rake collimators are as defined hereinbefore.

Although the LOrA technique of imaging small objects by SPECT results in surprisingly good constructed images, the spatial resolution along the longitudinal direction can still be improved in case target organs in small animals should be investigated, in particular organs like the kidneys in very small animals like mice.

According to another aspect of the present invention, such an improvement can be reached by using a preferred rake collimator, comprising, in a suitable embodiment, in addition to the raised walls, a plurality of collimator septa, transversely positioned to the raised walls and converging in the direction of the longitudinal slit to an imaginary focal line, transverse to said slit.

In another preferred embodiment, the preferred rake collimator comprises, in addition to the raised walls, at least one couple of short bars, in mutually parallel arrangement to leave a short slit in between, in a position transverse and just under or above the longitudinal slit. In the latter embodiment the rake collimator may comprise up to ten couples of short bars (and consequently of short slits). In this embodiment it is advantageous if said at least one couple of short bars is movable along the longitudinal slit; this may be effected e.g. by an electric motor. The short bars are preferably from iridium, gold or platinum.

It will be evident, that the above preferred embodiments of the rake collimator can also successfully be used in conventional SPECT imaging, both together with curved and with flat sensitive layers.

The present invention also relates to a system for imaging a target organ in a living being by SPECT, comprising four gamma-detectors, essentially at the corners of a rectangle, wherein each gamma detector is provided on its front with a rake collimator, in one of the above-defined preferred embodiments.

The present invention further relates to a method of imaging a target organ in a small animal by SPECT, by using the equipment as described hereinbefore, said method comprising:

acquiring images by relative movements between the detector-collimator combinations and the body of the animal on the table along four linear paths, parallel and perpendicular to the table surface, all transverse to the table length; and computer reconstructing the distribution of the radioactivity inside the body of the animal from the acquired images.

In performing imaging studies of small animals, the collective preferred rake collimators, as described above, as part of the imaging system of the invention, closely surround the living being on the table, preferably by moving the detector-collimator segments from and towards the test animals on the table. If the former preferred rake collimator is used, each collimator is so positioned relative to the table, that its longitudinal slit is parallel to the table length and that the collimator septa converge to an imaginary focal line transverse to the table length. If the latter preferred embodiment of the rake collimator is used, each collimator is so positioned relative to the table, that its couple of short bars is movable in the longitudinal direction of the table.

BRIEF DESCRIPTION OF THE DRAWINGS

The invention will now be described with reference to the accompanying drawings, wherein.

DETAILED DESCRIPTION OF THE DRAWINGS

Figure 1:
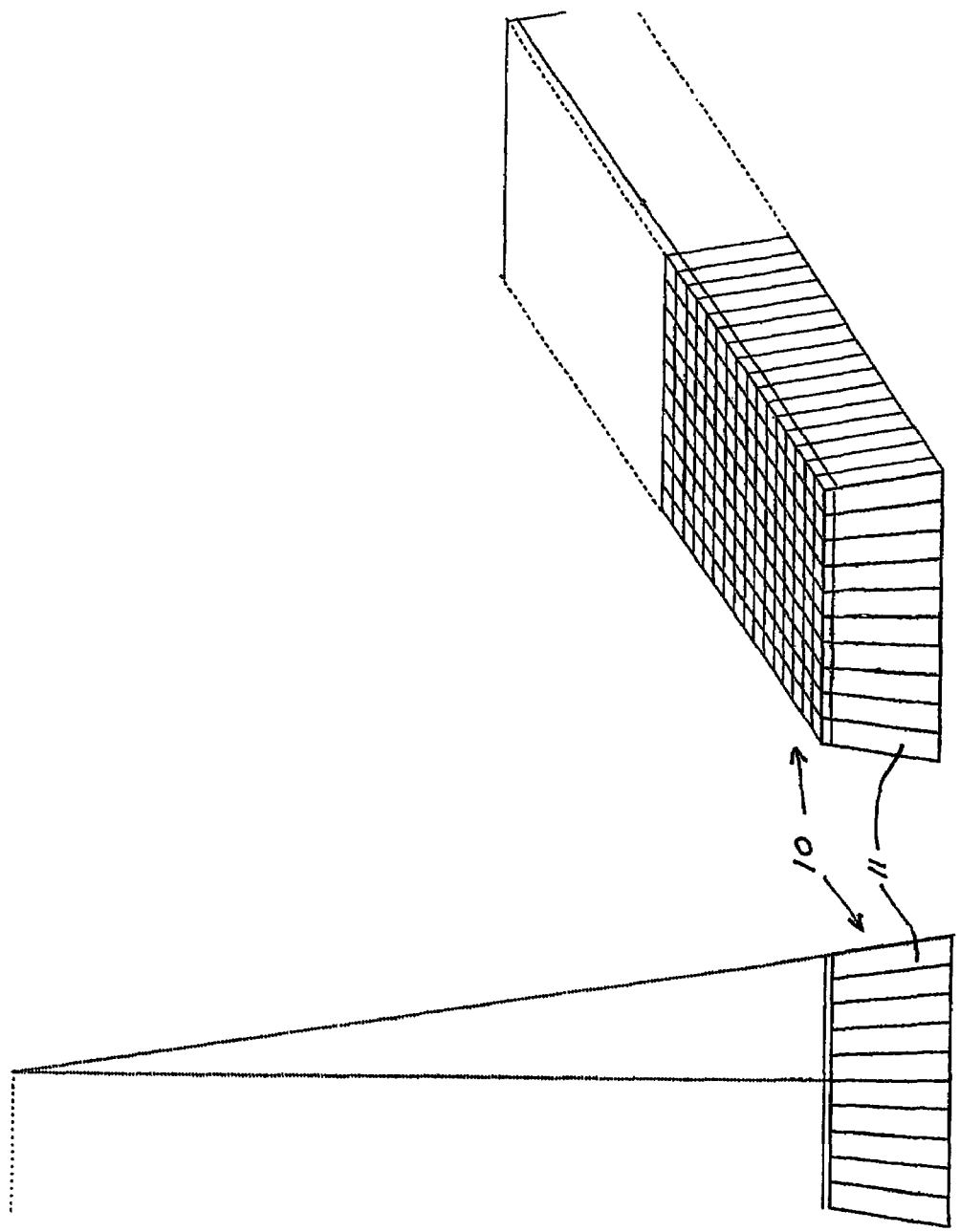
FIG. 1 shows a plurality of sensitive crystals as used for the sensitive layer or inner layer of the system according to the present invention, and illustrates how these crystals are obtained by cutting or sawing from a crystal block.

FIG. 1 shows a crystal block 10, in front view and in side view, and indicates how the sensitive crystals 11 are obtained by cutting or sawing.

Figure 2:
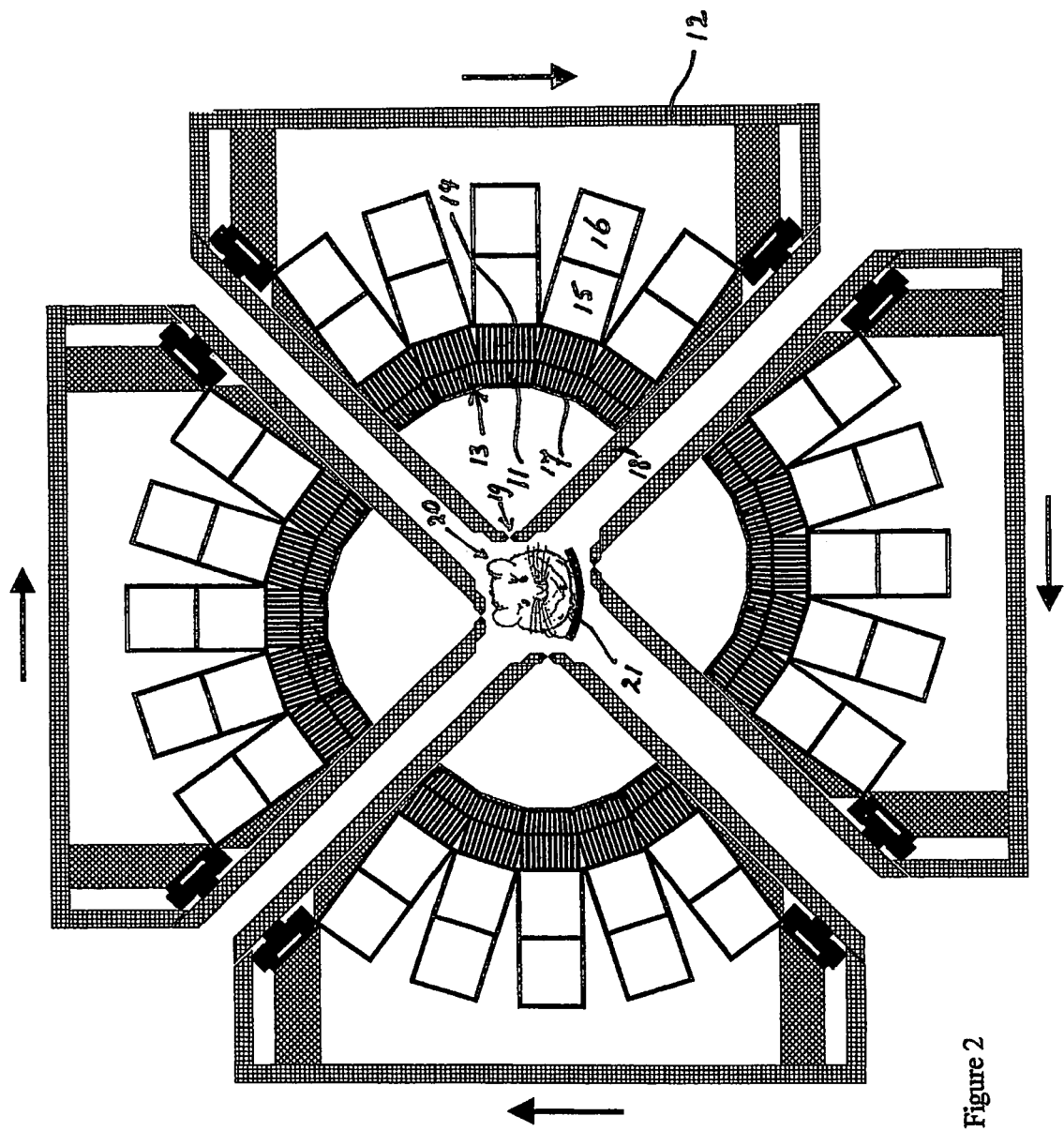
FIG. 2 is a schematic representation of the equipment of the preset invention for SPECT imaging in a suitable embodiment, viewed in the longitudinal direction of the table.

FIG. 2 shows the four segments of an imaging system according to the invention, each provided with a housing 12, an inner curved layer 13 of CsI(Na) crystals 11, a second sensitive layer 14 from GSO crystals, a photomultiplier 15, and a computer connection 16. The inner layer is protected against moisture etc. by aluminium foil 17. Each segment is provided with a rake collimator having two slanted raised walls 18, leaving a slit 19, with a width from 0.1 to 3 mm, between their top ends. The segments of the imaging system closely surround an animal 20 to be studied, fixedly positioned on a table 21. During imaging by SPECT the segments are moved related to the animal according to the arrows: along four linear paths parallel and perpendicular to the table surface.

Figure 3:
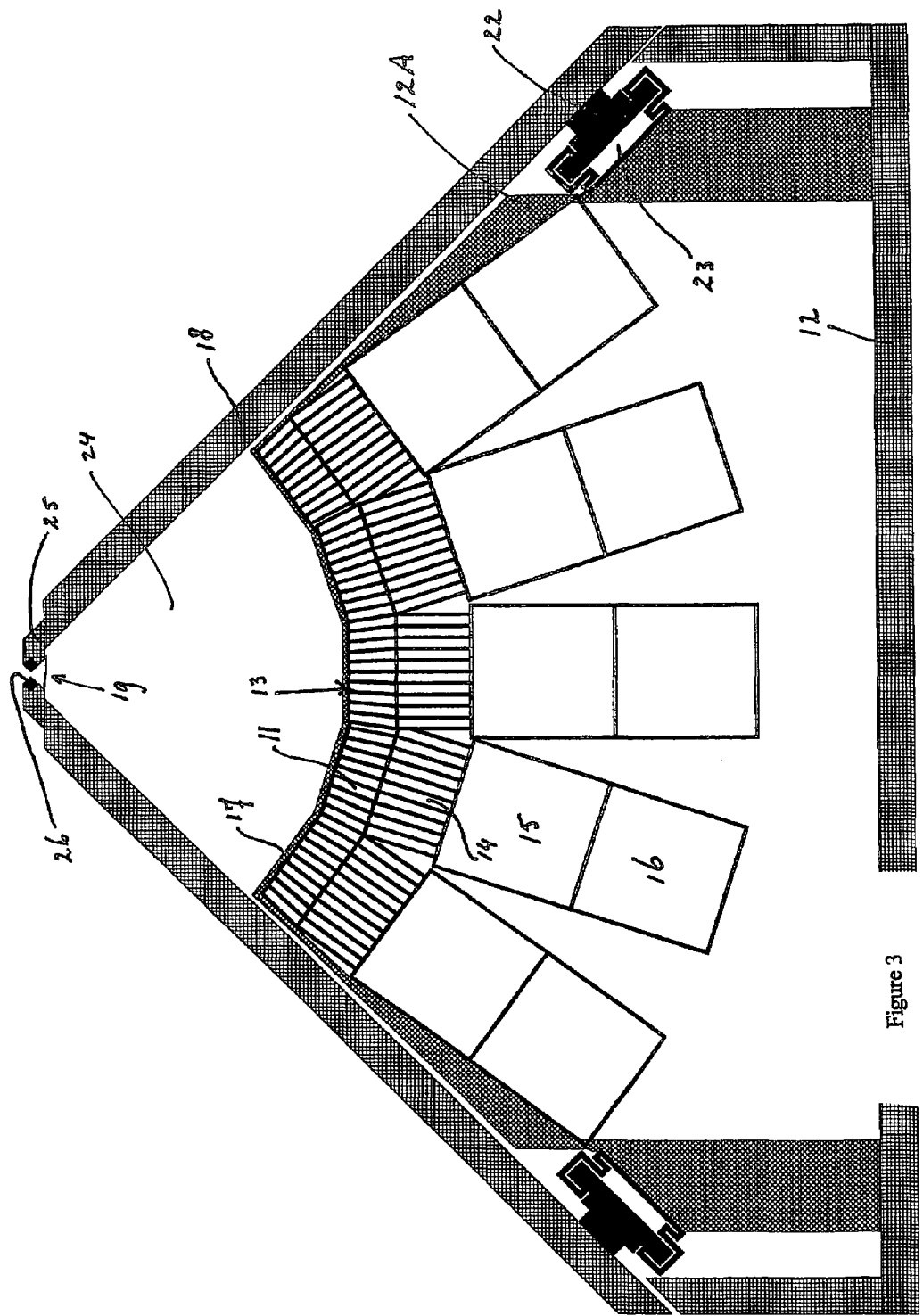
FIG. 3 shows one enlarged segment of the equipment of FIG. 2 with a rake collimator as presented in FIG. 2.
Figure 4:
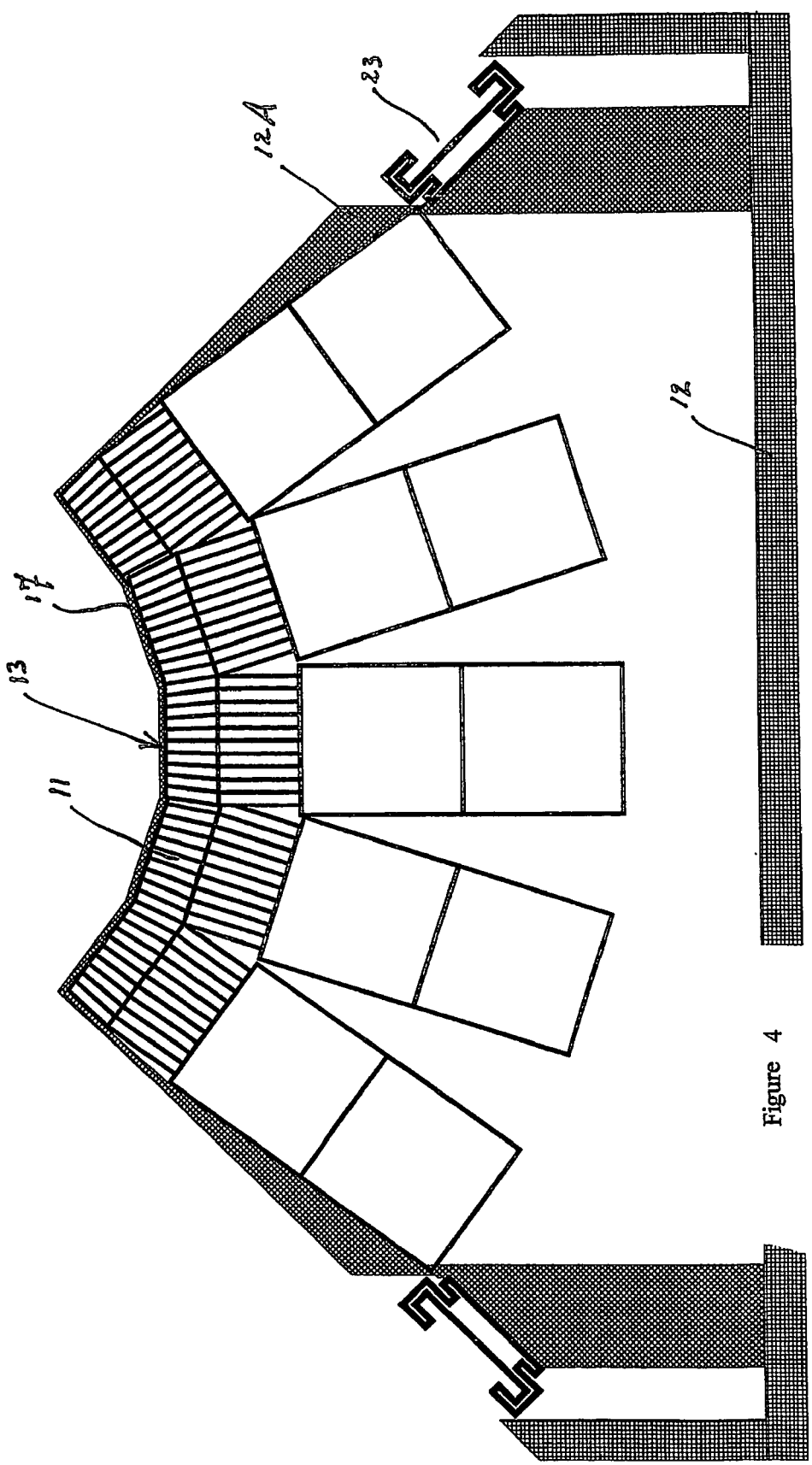
FIGS. 4 and 5 show schematically how the collimator can be removed and how the equipment of FIG. 2 can be made ready for imaging by PET (FIG. 5B).

In FIGS. 3 and 4, showing an enlarged segment of the FIG. 2 embodiment, the sliding means for removing/reinserting the collimators in forward or backward direction are shown: a longitudinal ridge 22 on the rake collimator, slidably adapted in a longitudinal groove 23 in the slanted wall 12A of the housing 12. A clamping or click connection may also be used to slidebly connect the collimator with the housing. In FIG. 4 the collimator has been removed.

Figure 5B:
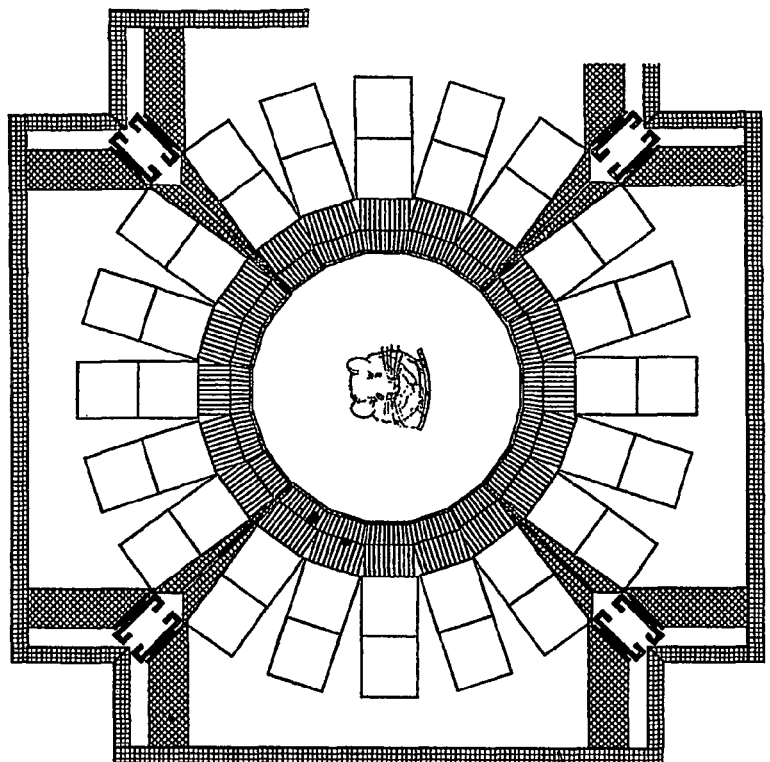
Figure 5A:
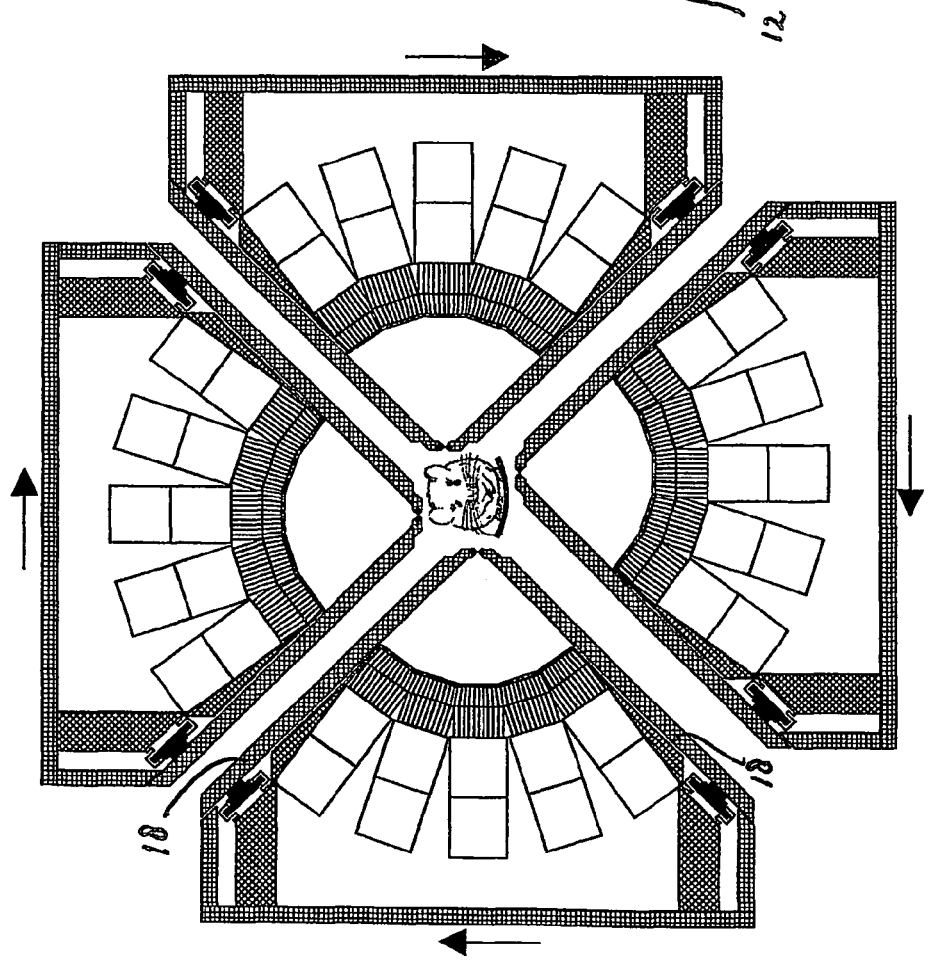

FIG. 5A shows the equipment of FIG. 2, ready for imaging by SPECT. After removal of the sliding collimators 18 and inward movement of the segments plus the housing 12, the equipment is ready for imaging by PET: FIG. 5B.

Figure 6:
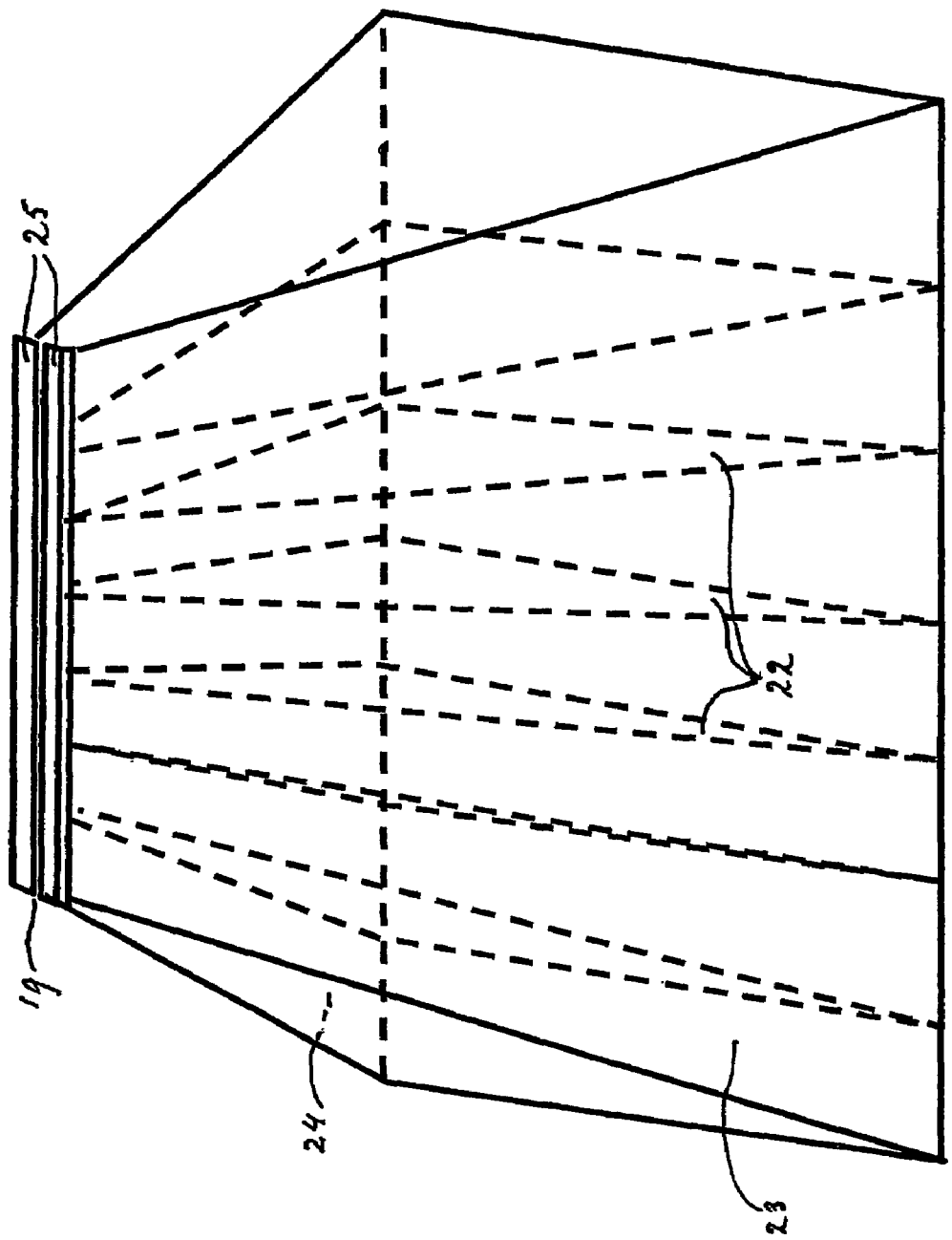
FIG. 6 shows a preferred embodiment of a rake collimator according to the present invention, in front view.

FIG. 6 shows a rake collimator, comprising two slanted raised walls 23 and 24. The collimator has a plurality of collimator septa 22, transversely positioned to the raised walls 23 and 24 and converging to the small longitudinal slit 19. The longitudinal slit 19 is left between the top ends of the raised walls, which can be adjusted (tuned) to the size of the object to be investigated, if desired. The top ends are provided with noses 25 of iridium. The collective septa 22 converge to an imaginary focal line (not shown), transverse to the longitudinal slit and also transverse to the surface of the drawing page.

Figure 7:
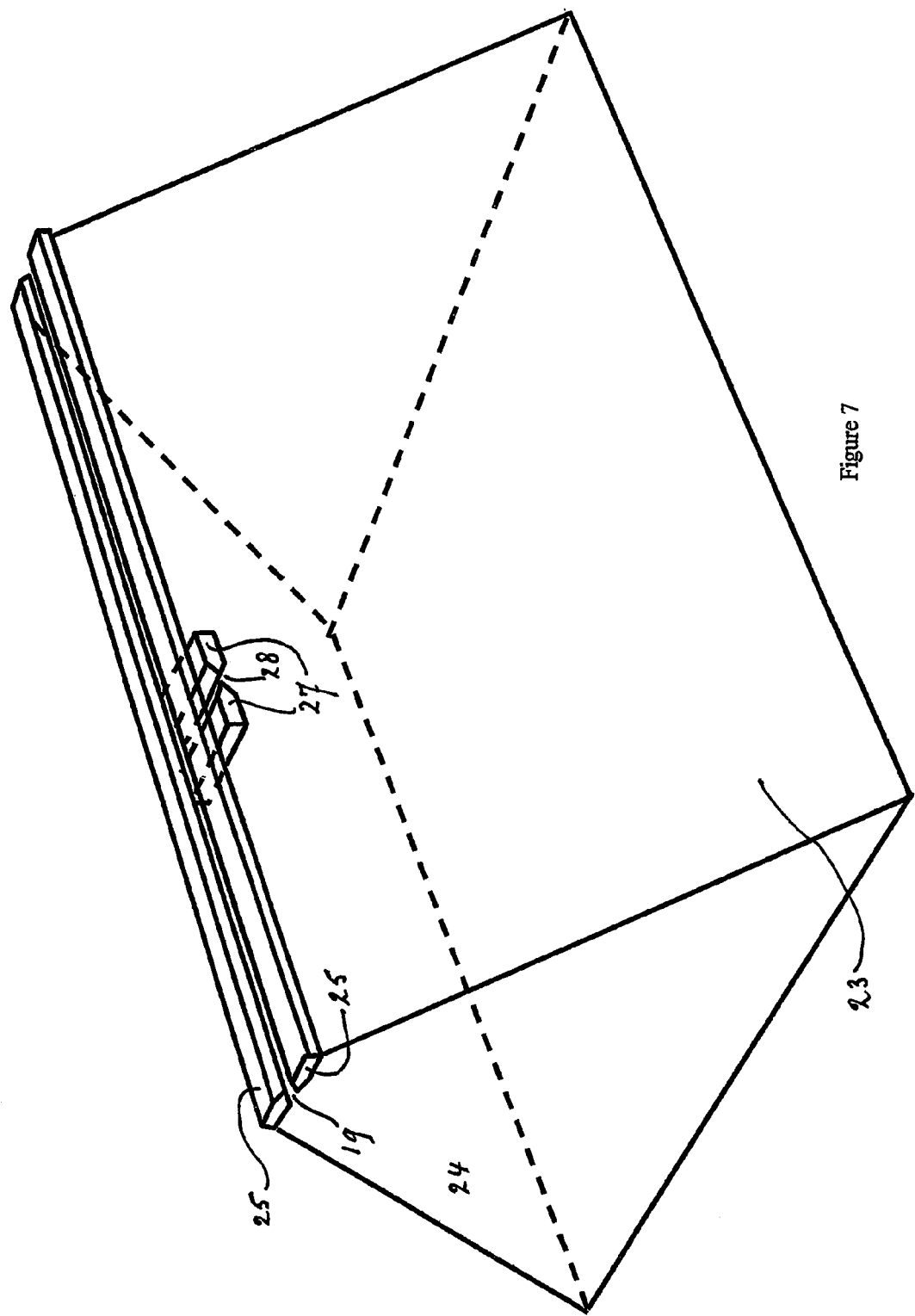
FIG. 7 shows another preferred embodiment of this rake collimator in bird's eye view.

The rake collimator shown in FIG. 7 also comprises two slanted raised walls 23 and 24, leaving a small longitudinal slit 19 in between their top ends, also adjustable (tunable) to the size of the object, if desired. These top ends contain at their extremities noses 25 of iridium. A couple of short bars 27 of iridium, in mutually parallel arrangement to leave a short slit 28 in between, is transversely positioned just under the longitudinal slit 19. These short bars can be moved (e.g. electrically operated) along the longitudinal slit.

The invention claimed is:

1. An equipment for imaging a target organ in a small animal by SPECT, comprising an imaging system and a table for an animal to be examined, said system comprising (i) a plurality of gamma detectors arranged at the corners of a rectangle surrounding said table, wherein each gamma detector comprises a plurality of sensitive crystals in side by side arrangement and is provided on its front with a rake collimator comprising two raised walls slanted towards the target to define a longitudinal slit in between their top ends, and (ii) means for positioning said system relative to said table in two perpendicular directions, both transverse to the table length, to effect movements parallel and perpendicular to the table surface, wherein each crystal of each gamma detector is tapered in one direction toward the table, a plurality of crystals being arranged in contiguous relation to form a sensitive layer which is curved to form a segment, a plurality of said segments surrounding said table, said longitudinal slit being arranged parallel to the table length and having a width from 0.1 to 3 mm, wherein the imaging system comprises means for moving the segments from and toward the table and means for removing and reinserting said collimators from and into their positions in front of the gamma detectors, respectively.

2. An equipment for imaging a target organ in a small animal by SPECT, comprising an imaging system and a table for an animal to be examined, said system comprising (i) a plurality of gamma detectors arranged at the corners of a rectangle surrounding said table, wherein each gamma detector comprises a plurality of sensitive crystals in side by side arrangement and is provided on its front with a rake collimator comprising two raised walls slanted towards the target to define a longitudinal slit in between their top ends, and (ii) means for positioning said system relative to said table in two perpendicular directions, both transverse to the table length, to effect movements parallel and perpendicular to the table surface, wherein each crystal of each gamma detector is tapered in one direction toward the table, a plurality of crystals being arranged in contiguous relation to form a sensitive layer which is curved to form a segment, a plurality of said segments surrounding said table, said longitudinal slit being arranged parallel to the table length, wherein the top ends of the raised walls of said rake collimator include adjustable elements to define a longitudinal slit with a width adjustable from 0.1 to 3 mm between their extremities.

3. Equipment as claimed in claim 2, wherein each of the sensitive crystals presents a rectangular cross section.

4. Equipment as claimed in claim 2, wherein the sensitive crystals are manufactured from one or more of the following materials: CsI(Na), BGO, GSO, LGSO, LSO and CZT-crystals.

5. Equipment as claimed in claim 2, wherein the raised walls and the adjustable elements of said rake collimator are formed of tungsten and each top end or element contains at its extremity a nose of iridium, gold or platinum.

6. Equipment as claimed in claim 2, wherein each of said collimators further comprises a plurality of collimator septa, transversely positioned to the raised walls and converging in the direction of the longitudinal slit to an imaginary focal line transverse to said slit.

7. Equipment as claimed in claim 2, wherein each of said collimators further comprises at least one pair of parallel short bars defining a short slit in between, said pair of short bars being transverse to the longitudinal slit and arranged just under or above said longitudinal slit.

8. Equipment as claimed in claim 7, wherein at least one pair of short bars is movable along the longitudinal slit.

9. Equipment as claimed in claim 7, wherein the short bars of said rake collimator are formed from iridium, gold or platinum.

10. Equipment as claimed in claim 2, wherein each of said collimators further comprises a plurality of collimator septa, transversely positioned to the raised walls and converging in the direction of the longitudinal slit to an imaginary focal line transverse to said slit.

11. Equipment as claimed in claim 2, wherein each of said collimators further comprises at least one pair of parallel short bars defining a short slit in between, said pair of short bars being transverse to the longitudinal slit and arranged just under or above said longitudinal slit.

12. A system for imaging a target organ in a small animal by SPECT, comprising a plurality of gamma detectors arranged at the corners of a rectangle, wherein each gamma detector comprises a plurality of sensitive crystals in side by side arrangement and is provided on its front with a rake collimator comprising two raised walls slanted toward the target to define a longitudinal slit in between their top ends, said crystals tapering in one forward direction arranged in contiguous relation to form a sensitive layer curved to form a segment, a plurality of said segments surrounding the target organ, means for moving the segments from and toward the target organ, and wherein said top ends of the raised walls of said rake collimator include adjustable elements to adjust the width of said longitudinal slit from 0.1 to 3 mm.

13. Imaging system as claimed in claim 12, wherein each rake collimator includes a plurality of collimator septa transversely positioned relative to the raised walls and converging in the direction of the longitudinal slit to an imaginary focal line transverse to said slit.

14. A system as defined in claim 12, and further comprising means for removing and reinserting said collimators from and into their positions in front of the gamma detectors, respectively.

15. Imaging system as claimed in claim 12, wherein each of said rake collimators includes at least one pair of parallel short bars defining a short slit therebetween, said pair of short bars being transverse to the longitudinal slit and arranged just under or above said longitudinal slit.

16. A method of imaging a target organ in a small animal by SPECT, by using an equipment including an imaging system and a table for an animal to be examined, said system comprising (i) a plurality of gamma detectors, arranged at the corners of a rectangle surrounding said table, wherein each gamma detector comprises a plurality of sensitive crystals in side by side arrangement and is provided on its front with a rake collimator comprising two raised walls slanted towards the target to define a longitudinal slit in between their top ends, and (ii) means for positioning said system relative to said table in two perpendicular directions, both transverse to the table length, to effect movements parallel and perpendicular to the table surface, wherein each crystal of each gamma detector tapers in one direction toward the table, said plurality of crystals being arranged in contiguous relation to form a sensitive layer curved to form a segment, a plurality of said segments surrounding said table, (iii) means for moving the segments from and towards the table, wherein the top ends of the raised walls of said rake collimator include adjustable elements to adjust the width of said longitudinal slit arranged parallel to the table length from 0.1 to 3 mm, said method comprising:

acquiring images by relative movements between the detector-collimator combinations and the body of the animal on the table along four linear paths parallel and perpendicular to the table surface, all transverse to the table length; and computer reconstructing the distribution of the radioactivity inside the body of the animal from the acquired images.

17. Method as claimed in claim 16, wherein each rake collimator includes at least one pair of parallel short bars defining a short slit therebetween, said pair of short bars being transverse to the longitudinal slit and arranged just under or above said longitudinal slit.

* * * * *